(12) United States Patent
Watanabe et al.

(10) Patent No.: US 7,251,987 B2
(45) Date of Patent: Aug. 7, 2007

(54) SCANNING PROBE MICROSCOPE AND MEASURING METHOD BY MEANS OF THE SAME

(75) Inventors: Masafumi Watanabe, Chiba (JP); Kazunori Ando, Chiba (JP)

(73) Assignee: SII NanoTechnology Inc. (JP)

( * ) Notice: Subject to any disclaimer, the term of this patent is extended or adjusted under 35 U.S.C. 154(b) by 183 days.

(21) Appl. No.: 11/088,086

(22) Filed: Mar. 23, 2005

(65) Prior Publication Data
US 2005/0210966 A1  Sep. 29, 2005

(30) Foreign Application Priority Data
Mar. 29, 2004  (JP) .............................. 2004-094101

(51) Int. Cl.
*G01B 5/28* (2006.01)
*G01N 13/16* (2006.01)
(52) U.S. Cl. ...................................................... 73/105
(58) Field of Classification Search .................. 73/105; 250/306
See application file for complete search history.

(56) References Cited

U.S. PATENT DOCUMENTS

| | | | | |
|---|---|---|---|---|
| 5,157,251 A | * | 10/1992 | Albrecht et al. | ............ 250/216 |
| 6,138,503 A | * | 10/2000 | Ray | ............................. 73/105 |
| 6,468,599 B1 | * | 10/2002 | Terada | ......................... 427/558 |
| 6,636,311 B1 | * | 10/2003 | Ina et al. | ..................... 356/401 |
| 2004/0083799 A1 | * | 5/2004 | Markakis et al. | ............. 73/105 |

* cited by examiner

*Primary Examiner*—Daniel S. Larkin
(74) *Attorney, Agent, or Firm*—Adams & Wilks

(57) ABSTRACT

A scanning probe microscope is capable of radiating light on a sample without moving the sample from the scanning probe microscope and is capable of measuring the sample while controlling the conditions under which the sample is placed without changing the location of the sample. The scanning probe microscope includes a cantilever having a probe at a distal end thereof, a sample moving device for moving the sample, and a detection unit for detecting deflection of the cantilever using a laser beam. The detection unit is detachably mounted to the scanning probe microscope during measurement of the sample and is detachable from the microscope to enable radiation of the sample with light without changing the location of the sample.

15 Claims, 2 Drawing Sheets

SCANNING PROBE MICROSCOPE AND MEASURING METHOD BY MEANS OF THE SAME

BACKGROUND OF THE INVENTION

1. Field of the Invention

The present invention relates to a scanning probe microscope, particularly, a scanning probe microscope for measuring a sample changing its physical characteristic, composition and/or shape by radiation of light, and to a method of measuring a sample by means of the microscope.

2. Background Art

Conventionally, in order to analyze a substance, such as photo-curing resin, which changes its physical characteristic, composition and/or shape by a photochemical reaction, or a substance adsorbed on a photocatalyst, by means of a scanning probe microscope before or after the radiation of light to evaluate the change in physical characteristic, composition and/or shape, a method has been used in which a sample before radiation of light is first analyzed by means of a scanning probe microscope, the sample is once taken out from the scanning probe microscope to be irradiated with light, and then, the sample is again introduced into the scanning probe microscope for analysis.

The conventional method includes, however, a step for taking out a sample from the scanning probe microscope, so that there is a problem of having a trouble in taking out and reintroducing the sample. Further, the scanning probe microscope has a problem in that it is difficult to adjust a probe to a preceding analysis place when the taken-out sample is introduced again. Moreover, there is another problem that, in the case of deformation, such as a bend or curing contraction due to a photochemical reaction, an amount of deformation of the preceding analysis place cannot be known even when the probe can be adjusted to the place.

In accordance with the above, the conventional method is considered not to be suitable for the purpose of evaluating change in physical characteristic in stages by radiating light a plurality of times. Further, in the case of a sample whose progress of a reaction changes in accordance with the atmosphere around the sample, the sample should be placed in a shielded container to be irradiated with light under a controlled atmosphere. The conventional method, however, has a problem that the sample is exposed to the air when taken out from and reintroduced into the scanning probe microscope.

The root of these problems is considered to be in a structure in which a mechanism for detecting the deflection or bending amount of a cantilever of the scanning probe microscope is mounted inside the scanning probe microscope and is not detachable independently of the cantilever (refer to Patent Reference 1, for example).

Patent Reference 1: JP-A-2003-50191

SUMMARY OF THE INVENTION

An object of the invention is to provide a scanning probe microscope capable of solving the above problems by radiating light on a sample without moving the sample from the scanning probe microscope and measuring the sample without changing the location of the sample and while controlling the condition under which the sample is placed.

For the purpose of solving the above-mentioned problems, the invention provides a scanning probe microscope comprising: a cantilever having a probe on a distal end thereof; sample moving means for moving a sample; detachable cantilever deflection detecting means for detecting the deflection or bending amount of the cantilever by means of a laser beam; and exposure means for exposing the sample to light from an upper side of the cantilever.

Further, the invention provides a scanning probe microscope, in which the cantilever, the sample and the sample moving means are provided inside an airtight container, the cantilever deflection detecting means and the exposure means are provided outside the airtight container and the laser beam and the light radiated from the exposure means are irradiated to the inside of the airtight container via a window through which light can pass.

Further, the invention provides a scanning probe microscope, in which quartz glass is used for the window to irradiate ultraviolet rays on the sample from the exposure means.

Moreover, the invention provides a scanning probe microscope, in which a mechanism for introducing any kinds of gas and a vacuum pump are further mounted to the airtight container so as to be able to control an atmosphere and a pressure in exposure.

In addition to the above, the invention provides a scanning probe microscope further comprising mechanism for controlling a temperature of the sample so as to be able to control a temperature in exposure.

Furthermore, the invention provides a measuring method in which the sample is measured by means of the scanning probe microscope, the cantilever deflection detecting means is detached to expose the sample by means of the exposure means, and then, the cantilever deflection detecting means is mounted again for measuring the sample after exposure.

In a scanning probe microscope in accordance with the invention, at the time of exposure, detaching an independently detachable cantilever deflection detecting means from the scanning probe microscope allows the sample to be exposed by means of an exposure light source without being blocked by the cantilever deflection detecting means, so that the sample can be exposed without moving the cantilever and the sample. Accordingly, the exact same place of the sample can be analyzed before and after exposure. This allows a sample including a substance, which changes its physical characteristic, composition and/or shape due to a photochemical reaction, or a sample including a substance adsorbed on a photocatalyst, to be efficiently measured and analyzed, so that change in physical characteristic, composition and/or shape of the sample can be evaluated.

Further, exposure is carried out under a condition that the cantilever approaches the sample, so that the sample is masked by means of the cantilever while it is exposed. Accordingly, a part of the sample shadowed by the cantilever is not exposed. Moreover, it can be seen on the basis of the shape of the cantilever which place of the sample is exposed. Therefore, measuring an area crossing over an exposed part and an unexposed part after exposure by means of the scanning probe microscope allows a shape and/or a physical characteristic of a surface of the sample before and after exposure to be evaluated by performing measurement once, and furthermore, a boundary between the exposed part and the unexposed part to be measured.

In addition to the above, providing the cantilever and the sample moving means inside the airtight container or a vacuum container, adding the gas introducing means and providing the cantilever deflection detecting means and the exposure light source outside the airtight container or the vacuum container allow a sample which changes its progress of a photochemical reaction in accordance with the change in atmosphere to be repeatedly exposed and measured in an environment in which the atmosphere is controlled.

DETAILED DESCRIPTION OF THE INVENTION

Embodiments of the invention will be described in detail hereinafter, making reference to the drawings.

Embodiment 1

Figure 1:
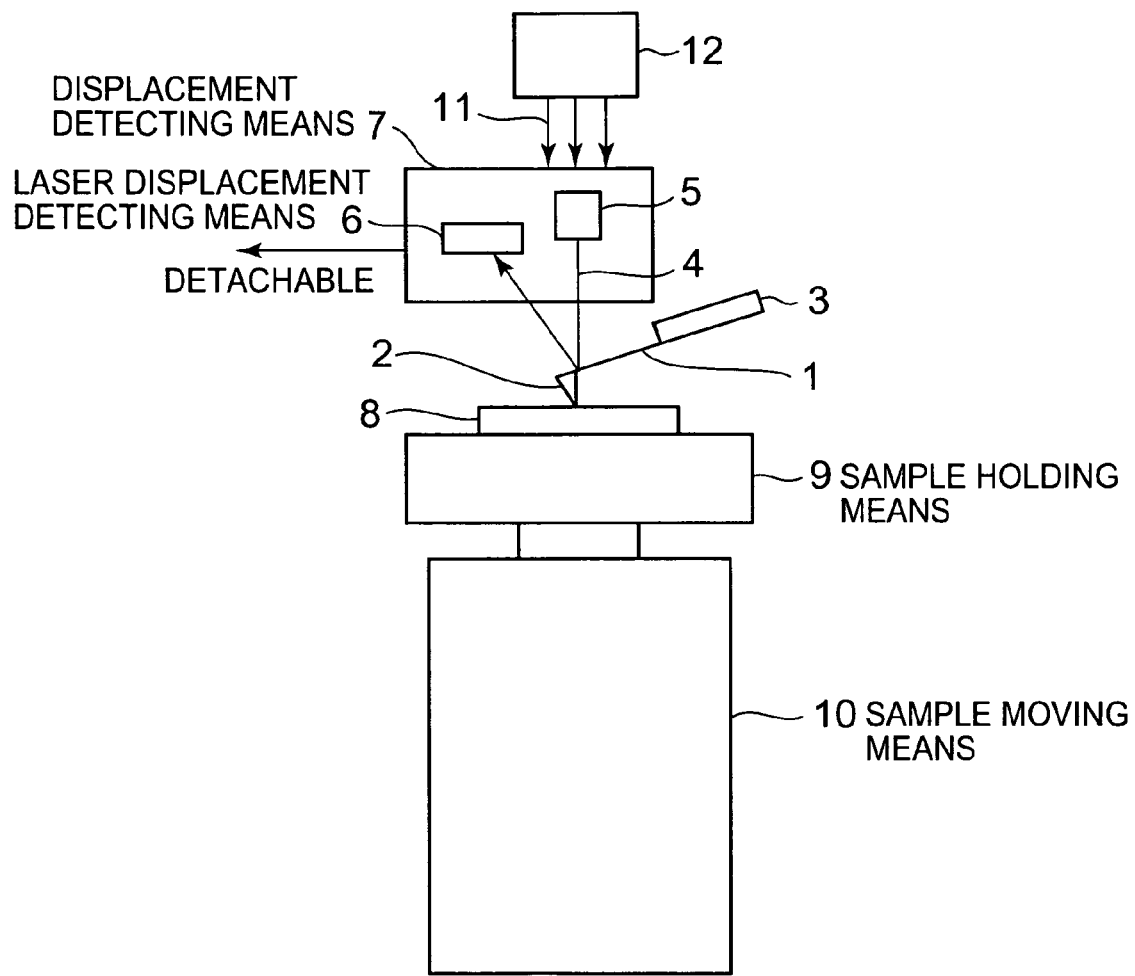
FIG. 1 is a schematic view showing a structure of a scanning probe microscope in a first embodiment of the invention.

FIG. 1, is a schematic view showing a structure of a scanning probe microscope in a first embodiment of the invention In FIG. 1, a cantilever 1 is formed of silicon or silicon nitride, has a shape of about 200 μm in length, about 40 μm in width and about 3 μm in thickness and is mounted to a cantilever holder 3. On a distal end of the cantilever 1 is provided a minute probe 2, which is produced by etching and is about 3 to 7 μm in height and whose radius at the distal end thereof is about 10 nm.

A laser beam source 5 for radiating a laser beam 4 and laser displacement detecting means 6 constitute a detection unit or cantilever deflection detecting means 7 independently from a sample and the cantilever 1 so as to be detachable from the scanning probe microscope without moving the sample and the cantilever. The laser beam 4 is radiated on the cantilever 1. The reflected laser beam from the cantilever 1 reaches the laser displacement detecting means 6. Detecting the displacement of a position where the reflected light reaches the detecting means 6 allows the deflection or bending amount of the cantilever 1 to be measured.

A sample 8 is fixed by means of sample holding means 9. Sample moving means 10 is used for changing a measuring place and scanning in measurement. The sample moving means 10 comprise a piezoelectric device and the like and is movable by application of a voltage. The moving direction of the sample moving means 10 is arranged to be determined in accordance with a plus or minus direction of a voltage while the moving amount of the above is arranged to be determined on the basis of the magnitude of a voltage.

An exposure light source 12 used as exposure means is fixed vertically above the cantilever 1 so that the cantilever deflection detecting means 7 is sandwiched between the exposure light source 12 and the cantilever 1. The exposure light source 12 radiates exposure radiating light 11. The wavelength or strength of the exposure radiating light 11 is changed in accordance with a purpose of measurement. In exposure, the cantilever deflection detecting means 7 is detached from the scanning probe microscope so as not to block the exposure radiating light 11.

Next, a method of measuring a sample (a measuring process) by means of a scanning probe microscope in the first embodiment will be described.

First, a sample 8 is measured with the cantilever deflection detecting means (detection unit) 7 being mounted in a detection position as shown in FIG. 1. The cantilever deflection detecting means 7 is then detached and moved out of the detection position and the sample 8 is exposed by means of the exposure light source 12. Subsequently, the cantilever deflection detecting means 7 is mounted again in the detection position to measure the sample 8. This allows the sample 8 to be measured before and after exposure without moving the sample 8 and the cantilever 1.

Figure 2:
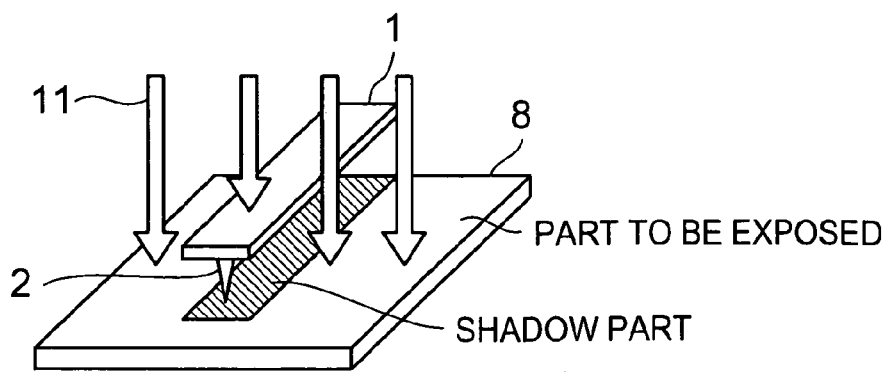
FIG. 2 illustrates a shadow of a cantilever of a scanning probe microscope in accordance with the invention, the shadow being cast at the time of exposure.

In exposure, a part of a surface of the sample 8 becomes a shadow of the cantilever 1, and thereby, is not exposed, as shown in FIG. 2. The shape of the shadow of the cantilever 1 can be known in advance in accordance with the shape of the cantilever 1. Accordingly, in order to measure the exposed part, a moving amount of the sample, which is necessary to move the probe 2 to a part outside of the shadow, can be calculated on the basis of the shape of the shadow to move the sample by means of the sample moving means 10. Further, measuring the shadow part allows a state before exposure to be measured. Moreover, measuring an area crossing over the exposed part and the shadow part allows the sample 8 before and after exposure to be measured at one time.

Embodiment 2

Figure 3:
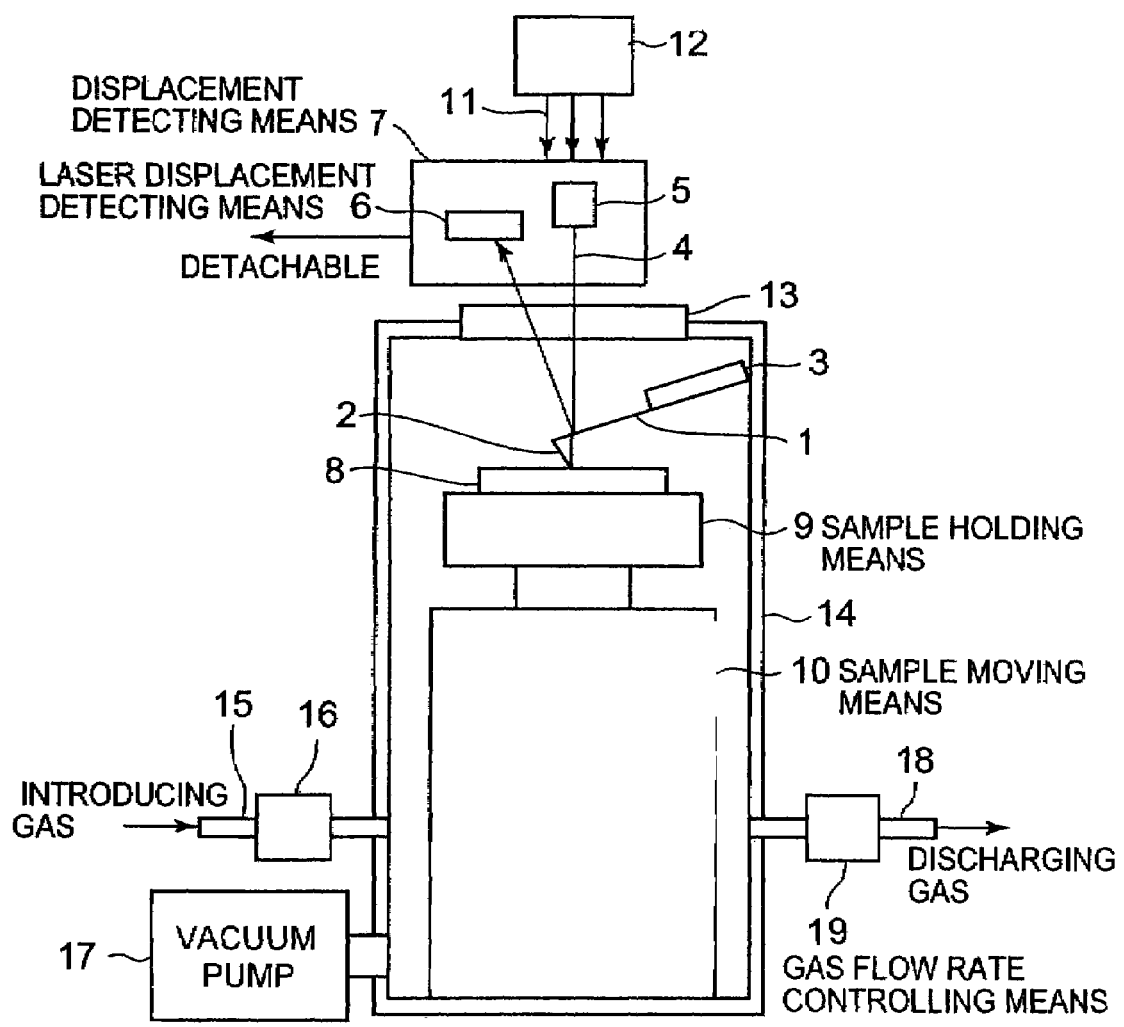
FIG. 3 is a schematic view showing a structure of a scanning probe microscope in a second embodiment of the invention.

FIG. 3 is a schematic view showing a structure of a scanning probe microscope in a second embodiment of the invention. Components common to those of Embodiment 1 shown in FIG. 1 are marked with the same reference signs and numerals and detail description thereof is omitted.

In FIG. 3, a window 13 is made of transparent glass through which light can pass. In the case of using ultraviolet rays as the exposure radiating light, a window made of quartz glass is used to allow the ultraviolet rays to pass through. An airtight chamber or container 14 contains therein a cantilever 1, a cantilever holder 3, sample holding means 9 and sample moving means 10. It is possible to mount the cantilever bending amount detecting means 7 outside the airtight container 14.

The laser beam 4 radiated from the laser beam source 5 of the cantilever deflection detecting means 7 is incident on the window 13 to enter the inside of the airtight container 14. The laser beam 4 is then reflected from the cantilever 1 to exit the airtight container 14 through the window 13 and be incident on the laser displacement detecting means 6.

The airtight container 14 is capable of introducing a desired gas inside by means of a gas introducing pipe 15, gas flow rate controlling means 16 and a vacuum pump 17 with the atmospheric pressure of the gas being controlled. The gas is evacuated from the airtight container 14 by means of a gas discharge pipe 18 and gas flow rate controlling means 19.

In the scanning probe microscope in the second embodiment, controlling the atmosphere and the atmospheric pressure of the inside of the airtight container 14 before carrying out the measurement described in Embodiment 1 allows change in photochemical reaction caused by change in atmosphere to be measured.

[FIG. 1]
1: DETACHABLE
[FIG. 2]
2: PART TO BE EXPOSED
3: SHADOW PART
[FIG. 3]
4: DETACHABLE

5: INTRODUCING GAS
6: DISCHARGING GAS

DESCRIPTION OF REFERENCE NUMERALS
AND SIGNS

1: cantilever
2: probe
3: cantilever holder
4: laser beam
5: laser beam source
6: laser displacement detecting means
7: cantilever bending amount detecting means
8: sample
9: sample holding means
10: sample moving means
11: exposure radiating light
12: exposure light source
13: window
14: airtight container (vacuum container)
15: gas introducing pipe
16: gas flow rate controlling means
17: vacuum pump

What is claimed is:

1. A scanning probe microscope comprising: a cantilever having a probe on a distal end thereof; sample moving means for moving a sample; detachable cantilever deflection detecting means for detecting deflection of the cantilever by means of a laser beam; and exposure means for exposing the sample to light from an upper side of the cantilever.

2. A scanning probe microscope according to claim 1, wherein the cantilever, the sample and the sample moving means are provided inside an airtight container, the cantilever deflecting detecting means and the exposure means are provided outside the airtight container, and the laser beam and the light radiated from the exposure means are introduced to the inside of the airtight container via a window through which light can pass.

3. A scanning probe microscope according to claim 2, wherein the window is comprised of quartz glass to permit ultraviolet rays from the exposure means to pass through the window.

4. A scanning probe microscope according to claim 2, wherein a mechanism for introducing gas and a vacuum pump are mounted to the airtight container so as to be able to control an atmosphere and a pressure within the container at the time of exposure.

5. A measuring method using a scanning probe microscope having a cantilever that has a probe on a distal end thereof, sample moving means for moving a sample, detachable cantilever deflection detecting means for detecting deflection of the cantilever by means of a laser beam, and exposure means for exposing the sample to light from an upper side of the cantilever, the method comprising the steps: measuring the sample by means of the scanning probe microscope; detaching the cantilever deflection detecting means to expose the sample by means of the exposure means; and then attaching the cantilever deflection detecting means for measuring the sample after exposure.

6. A scanning probe microscope comprising: a cantilever having a probe at a distal end thereof; sample moving means for moving a sample to be measured during use of the scanning probe microscope; exposure means disposed above the cantilever for exposing the sample to radiation; and a detection unit movable to a detection position to optically detect deflection of the cantilever during measurement of the sample before and/or after radiation of the sample by the exposure means and movable out of the detection position to enable radiation of the sample by the exposure means.

7. A scanning probe microscope according to claim 6; wherein the detection unit is detachably mountable to the scanning probe microscope to position the detection unit in the detection position and is detachable from the scanning probe microscope to enable movement of the detection unit out of the detection position.

8. A scanning probe microscope according to claim 7; wherein the detection unit, when in the detection position, blocks radiation from the exposure means from radiating the sample.

9. A scanning probe microscope according to claim 7; wherein the detection unit comprises a laser beam source that directs a laser beam onto a surface of the cantilever, and detecting means for detecting the reflected laser beam reflected from the surface of the cantilever.

10. A scanning probe microscope according to claim 9; further including an airtight chamber in which are disposed the cantilever and the sample moving means; and wherein the exposure means and the detection unit are disposed outside the airtight chamber.

11. A scanning probe microscope according to claim 10; wherein the airtight chamber has a window through which pass the radiation from the exposure means and the laser beam from the laser beam source to the inside of the airtight chamber.

12. A scanning probe microscope according to claim 11; wherein the window is comprised of quartz glass.

13. A scanning probe microscope according to claim 6; wherein the detection unit, when in the detection position, blocks radiation from the exposure means from radiating the sample.

14. A scanning probe microscope according to claim 6; wherein the detection unit comprises a laser beam source that directs a laser beam onto a surface of the cantilever, and detecting means for detecting the reflected laser beam reflected from the surface of the cantilever.

15. A scanning probe microscope according to claim 6; further including an airtight chamber in which are disposed the cantilever and the sample moving means; and wherein the exposure means and the detection unit are disposed outside the airtight chamber.

* * * * *